United States Patent [19]

Prendergast et al.

[11] Patent Number: 5,045,218

[45] Date of Patent: Sep. 3, 1991

[54] METHOD OF SEPARATING A LIGHTER DISPERSED FLUID FROM A DENSER LIQUID IN A HYDROCYCLONE HAVING FLOW-MODIFYING MEANS

[75] Inventors: Gagan J. J. Prendergast, Nt. Waverley; David A. Webb, Northcote, both of Australia

[73] Assignee: Delawood Pty. Ltd., Caulfild, Australia

[21] Appl. No.: 362,390

[22] PCT Filed: Nov. 26, 1987

[86] PCT No.: PCT/AU87/00398

§ 371 Date: May 25, 1989

§ 102(e) Date: May 25, 1989

[87] PCT Pub. No.: WO88/03842

PCT Pub. Date: Jun. 2, 1988

[30] Foreign Application Priority Data

Nov. 26, 1986 [AU] Australia .............................. PH9165
Feb. 6, 1987 [AU] Australia .............................. PI0217

[51] Int. Cl.[5] .............................................. B01D 17/038

[52] U.S. Cl. .......................................... 210/787; 55/52; 55/460; 210/512.1

[58] Field of Search ...................... 55/204, 456, 459.1, 55/460, 1, 52; 210/512.1, 512.2, 512.3, 787, 788; 209/144, 211; 166/105.1, 267

[56] References Cited

U.S. PATENT DOCUMENTS

| | | | |
|---|---|---|---|
| 1,576,108 | 3/1926 | Fogler | 210/512.1 |
| 2,757,581 | 1/1953 | Freeman et al. | 209/144 |
| 2,816,490 | 12/1957 | Boadway et al. | 210/512.1 |
| 2,982,409 | 5/1961 | Boadway et al. | 209/211 |
| 4,237,006 | 12/1980 | Colman et al. | 210/788 |
| 4,251,368 | 2/1981 | Colman et al. | 210/512.1 |
| 4,389,307 | 6/1983 | Boadway | 210/512.2 |
| 4,414,112 | 11/1983 | Simpson et al. | 209/211 |
| 4,576,724 | 3/1986 | Colman et al. | 210/512.1 |
| 4,710,299 | 12/1987 | Prendergast | 209/211 |
| 4,721,565 | 1/1988 | Carroll | 210/512.2 |
| 4,744,890 | 5/1988 | Miller et al. | 209/211 |

FOREIGN PATENT DOCUMENTS

| | | | |
|---|---|---|---|
| 2205369 | 5/1974 | France | 209/144 |
| WO84/04702 | 12/1984 | PCT Int'l Appl. | 210/739 |
| 601051 | 3/1978 | U.S.S.R. | 209/144 |
| 1049113 | 10/1983 | U.S.S.R. | 209/144 |
| 1150041 | 4/1985 | U.S.S.R. | 55/512.1 |
| 1150043 | 4/1985 | U.S.S.R. | 209/211 |
| 1292835 | 2/1987 | U.S.S.R. | 209/211 |

*Primary Examiner*—Robert A. Dawson
*Assistant Examiner*—Joseph Drodge
*Attorney, Agent, or Firm*—Fleit, Jacobson, Cohn, Price, Holman & Stern

[57] ABSTRACT

A hydrocyclone is disclosed for separating, at least partially, fluid mixtures having a predominant liquid component. The hydrocyclone has a first end and a second end remote from the first end. The cross-sectional area of the hydrocyclone in at least one location towards the second end is less than the cross-sectional area at the first end. The hydrocyclone further includes at least one inlet in the region of the first end for introducing the feed mixture and at least two outlets with at least one outlet in the region of the second end. The hydrocyclone has in the region of the second end a fixed or moveable flow-modifying element located at or near the hydrocyclone axis and the element is constructed to affect the flow towards the second end of fluid containing a relatively large portion of less dense component but to allow flow past the element towards the second end of the fluid containing a relatively large portion of a more dense component. Preferred geometric and flow parameters for the cyclone are disclosed.

16 Claims, 3 Drawing Sheets

METHOD OF SEPARATING A LIGHTER DISPERSED FLUID FROM A DENSER LIQUID IN A HYDROCYCLONE HAVING FLOW-MODIFYING MEANS

This invention relates to cyclone separator devices (hereinafter called "hydrocyclones") capable of separating at least partially, if not to a substantial extent. predominantly fluid mixtures of two or more components or phases of differing densities.

This invention may find particular application in separation of fluid mixtures where at least one of the fluid components to be separated is sensitive to regions of high fluid shear, i.e. the interfacial properties being such that fluid mixtures may become further emulsified rather than separated into fluid velocity fields. For example, the fluid mixtures may be, or may contain, oil and water. The fluid mixtures may also contain some solids and/or dissolved or free gas. This invention also relates to methods of separating at least partially, if not substantially, fluid mixtures of two or more components as previously described.

PRIOR ART

Cyclone separators (normally called "cyclones"). but more importantly in relation to this invention. hydrocyclones, have been in use for some time. Their use and application to separating solids from gas and solids from liquids in particular is well documented. See for example "The Hydrocyclone" by D. Bradley (Pergamon Press. 1965) and "Hydrocyclones" by Svarvosky (Holt, 1984). The most typical form of cyclones used for these purposes is of a straight conical shape. However, a number of specialised designs exist to treat particular mixtures or derive special benefits. See for example U.S. Pat. Nos. 4,389,307, 2,982,409 and 2,849,930 as examples of hydrocyclones applied to pulp and paper separation.

The potential benefits to be derived by successfully applying hydrocyclones to liquid/liquid separation (e.g. oil/water) have long been recognized. However it has only been in recent times that hydrocyclone designs have been developed to an extent where they have achieved significant commercial acceptance for this particular task.

Earlier hydrocyclones were of a type and design developed substantially by reference to the knowledge and art of solid/liquid separation technology. These hydrocyclones performed comparatively poorly when applied to liquid/liquid separation.

As will be familiar to those skilled in the art relating to liquid/liquid hydrocyclones, those designs failed to take proper account of the major differences between the nature and behaviour of liquid/liquid and liquid/solid mixtures. These differences include:

(a) The density difference between two liquids is typically much smaller than the difference between solids and liquids.

(b) Liquid/liquid mixtures are susceptible to reemulsification particularly with mixtures where the interfacial properties of the mixture are unfavourable.

As these and other differences were considered more appropriately in the re-design of hydrocyclones for liquid/liquid separation very different high performance hydrocyclones were developed. Different designs can be applied to different fluid mixtures. In particular, hydrocyclone designs of one class have been developed for the problem of separating a small amount of less dense component/s from fluid mixtures and of another class for separating a small amount of a more dense component/s from fluid mixtures. Said small amounts of less dense and more dense component/s typically exist in particle form. but most typically in droplet form, in the fluid mixtures.

Hydrocyclones of the first type designed for the separation of a small amount of less dense component as described in the prior art are distinguishable from solid/liquid hydrocyclones by the inclusion of features such as flow smoothing inlet areas, or swirl chambers, and are relatively long.

Patent literature which describes the prior art includes the following:

AU-47106/79 describes a hydrocyclone where the body of the hydrocyclone is made up of two cylindrical sections with a flow smoothing taper included between the sections. The design as claimed is described by mathematical relationships between parameters such as inlet area, lengths and diameters of the inlet, outlets and cylindrical sections.

AU-47105/79 is similar to the above but includes a third cylindrical portion and a second flow smoothing taper between the second and third cylindrical portions.

AU-84713/82 describes a hydrocyclone with a relatively small light phase outlet of diameter $d_o$.

Based on the above three specifications. various applications for patent have been filed. AU-89106/82 and PCT/AU84/00097 describe designs with variable overflow outlets. PCT/AU83/00028 describes a mechanical device for de-blocking the small light phase outlet hole. and further describes a fourth portion of the hydrocyclone used to control the flow of fluid through the hydrocyclone.

PCT/AU84/00195 describes an arrangement where the light phase is removed from the downstream outlet end.

PCT/AU85/00010 describes a hydrocyclone which includes an involute inlet. Other patent applications describing various other features include PCT/AU84/00293, PCT/AU86/00111 and PCT/AU85/00288.

Other types of light dispersion hydrocyclones are described in PCT/AU85/00181 and PCT/AU86/00173. These differ from previous hydrocyclones in that the body of the hydrocyclone is curved. The designs claimed are described by mathematical relationships, one important feature being the swirl number Sn (this is similar to non-dimensional velocity ratio). It is said that for effective operation of this design the swirl number must conform to the criterion $3 \lesssim Sn \lesssim 12$.

Similarly, patent applications have been made for hydrocyclones designed for the treatment of a small amount of more dense component in fluid mixtures. PCT/AU85/00293 contains references to such hydrocyclone separators and PCT/AU85/00322 describes such a hydrocyclone consisting of cylindrical portions and described by various mathematical relationships.

BACKGROUND OF THE INVENTION

Hydrocyclones designed in accordance with the present invention are believed to exhibit improvements when considered in relation to the prior art. Problems arising with hydrocyclones designed in accordance with the prior art include:

1. Usually they are relatively long and often require comparatively more space in an installation, particularly where a large number of hydrocyclones are used. This may be a significant disadvantage in installations where the cost of space is large, such as on an oil production platform.

2. The prior art refers to a relatively high pressure differential between the inlet means for admission of the fluid mixture to the hydrocyclone and the outlet means for discharge of fluid having a relatively high concentration of less dense component. This characteristic of the prior art can have at least two unfavourable consequences—first, a higher inlet pressure may be required to operate the hydrocyclone, and second, the turndown ratio may be less ("turndown ratio" is the ratio of maximum to minimum flow rate at the hydrocyclone inlet/s of the fluid mixture for the available maximum inlet pressure and minimum outlet pressures at which the hydrocyclone may be operated).

3. Prior art hydrocyclones are often ill-suited to the separation of highly viscous fluids. With such fluids, the dissipation of vorticity and loss of kinetic energy can lead to poor separation of components.

4. Prior art hydrocyclones are often comparatively inefficient when applied to the separation of finely dispersed components.

5. Towards the second end of such hydrocyclones the flow can become unstable, often resulting in flow disturbances that reduce the separating effect.

6. In particular, an operational difficulty has been encountered when operating hydrocyclones of a type described by reference to PCT/AU83/00028. It has been found that hydrocyclones with a fourth portion of reduced diameter do not perform as expected. It was in fact found that this decreasing diameter caused a proportionally greater decrease in flow of the less or least dense component/s as compared to flow of more or most dense component/s thereby reducing the turndown ratio of the hydrocyclone, this being an undesirable effect.

Compared to the prior art, it is believed that a hydrocyclone according to the present invention can exhibit one or more of the following advantages relative to the prior art:

1. shorter length;
2. greater inlet volumetric flow rate;
3. lower concentration of less dense component/s in the more dense component/s at the outlet/s of the hydrocyclone where this feature is desired;
4. lower concentration of more dense component/s in the less dense component/s at the outlet/s of the hydrocyclone where this feature is desired;
5. lower pressure differential between one or more inlet means for admission of fluid mixture to the hydrocyclone and one or more outlet means for discharge of fluid having a relatively high concentration of less dense component/s;
6. improved performance with viscous fluids;
7. easier construction of hydrocyclone configuration in practice; and
8. simpler and more reliable operation and maintenance.

INTRODUCTION TO THE INVENTION

According to the present invention there is provided a hydrocyclone being capable of separating at least partially, if not to a substantial extent, a feed mixture, more typically a mixture with two or more fluid components, with at least one predominant liquid component. In addition said mixture may contain smaller amounts of gas and some solids. For example, such mixtures might include, but not the limited to, oil and water, shear-sensitive flocks of solids and liquids, particularly where concentrations are low. A hydrocyclone according to the present invention comprises at least a first end and, remote from said first end, a second end, the cross-sectional area of the hydrocyclone in at least one location towards the second end being less than the cross-sectional area of the hydrocyclone at said first end. Such hydrocyclones further include at least one inlet means in the region of the said first end for introducing feed mixture and at least two outlet means with at least one outlet means in the region of the said second end.

An "axis" and "cross-section" may be defined by considering a straight or curved line imagined to be drawn within the hydrocyclone, and planes arbitrarily constructed so as to intersect that point and to cut off various sections of the hydrocyclone. For each point there will be a section of minimum area. The line which at each point is normal to that section and passes through its centre (centroid if the section by asymmetrical) may be called the hydrocyclone axis, and said section the cross-section at that point.

Preferably the majority by mass of the fluid mixture to undergo separation is admitted to the hydrocyclone in the region of the said first end and is admitted in such a way that said fluid mixture attains substantially rotational velocity about the hydrocyclone axis and may also attain an axial velocity component. The region of the said first end is so shaped as to promote substantial conversion of fluid linear momentum into angular momentum about the hydrocyclone axis.

The greater portion of fluid entering the hydrocyclone in the region of said first end will flow towards second end and will attain at least an axial velocity component parallel to the hydrocyclone axis. This fluid will typically flow towards said second end with an increasing axial velocity, this being an effect of a decreasing cross-sectional area of the hydrocyclone. Viscosity effects may offer a general resistance to velocity within the hydrocyclone although the tendency for angular momentum to the conserved may, in spite of viscosity, increase the general rotation as the fluid flows towards said second end. The said second end of the hydrocyclone extends to a location, or locations, at which dynamic or kinematic behaviour of the fluid, most importantly separation of components of the fluid, at that location, or locations, is no longer significant.

Typically, a minor portion of fluid entering the hydrocyclone in the region of said first end will be impelled by centripetal forces towards the hydrocyclone axis, there to form a lengthwise extending "core" with a typical flow towards said first end rather than towards said second end. Typically such a core comprises fluid having a relatively high proportion of less dense component/s.

Said outlet means in the region of said first end (for discharge of fluid having a relatively high concentration of less dense component/s) may have its axis/their axes located at or close to the hydrocyclone axis and may take the form of one or more orifices of circular or other cross-sectional shape and may reach its/their diameter/s or width/s instantaneously or by any form of abrupt or smooth transition and may widen thereafter by taper or step or take other geometry. The axis or axes of said outlet means may be coincident with, substantially coincident with, or parallel to, or inclined to the hydrocyclone axis.

THE INVENTION

(A) Flow Stabilised Hydrocyclone

With hydrocyclones designed for the separation of both more dense and less dense component/s from fluid mixtures it is believed that the geometry of the said second end may have a substantial effect on the rotational velocity and behaviour of fluid in the hydrocyclone.

According to one aspect of this invention there is provided a hydrocyclone for separating at least partially, if not to a substantial extent, predominantly fluid mixtures having at, least one predominant liquid component, said hydrocyclone comprising at least a first end and, remote from said first end, a second end, the cross-sectional area of the hydrocyclone in at least one location towards said second end being less than the cross-sectional area of the hydrocyclone at said first end, said hydrocyclone further including at least one inlet means in the region of the said first end for introducing feed mixture/s and at least two outlet means, with at least one outlet means in the region of said second end, said hydrocyclone further including in the region of said second end fixed or movable flow-modifying means located at or near the hydrocyclone axis, said means being so constructed as to affect, if not to substantially impede and stabilize, the flow towards the said second end of fluid containing a relatively large proportion of less dense component but to allow substantial annular flow, past said flow-modifying means towards said second end, of fluid containing a relatively large proportion of more dense component. When said outlet means for that part of the fluid containing a relatively large proportion of less sense component is located in the region of said first end, it is believed that the effect of said flow-modifying means is to increase the pressure or flow rate of that part of the fluid containing a relatively large portion of less dense component at said outlet means in the region of said first end.

The said flow-modifying means is most preferably solid, but can be semi-permeable or permeable. It may take the form of a baffle, rod or a plate-shaped device. The said flow-modifying means may be supported in the hydrocyclone by a variety of means, for example a rod aligned along the hydrocyclone axis. Most preferably, said support means is so positioned so that it does not substantially interfere with or impede fluid flows but provides good mechanical support for said flow-modifying means. Said flow-modifying means may be axially-symmetric in cross-section, said cross-section being taken normal to the hydrocyclone axis and said cross-sectional area may vary along hydrocyclone axis. However, said means need not be axially-symmetric and need not be of a special shape. Concave, even convex and irregular shapes (such shapes being as viewed from said first end), have been found to function satisfactorily. It has been found that in certain instances, in particular with irregular shaped flow-modifying means, it is preferable to locate said means off the hydrocyclone axis.

The "effective cross-sectional area of said flow-modifying means" can be defined as the cross-sectional area of said flow-modifying means at the location where the previously disclosed effect on the flow of the fluid containing a relatively large proportion of less dense component is produced. This cross-sectional area is measured normal to the hydrocyclone axis. Said flow-modifying means can be further characterised in that the ratio of the minimum effective cross-sectional area $A_1$ of the hydrocyclone towards said first end, measured in a location that does not include said flow-modifying means and in a plane normal to the hydrocyclone axis, to the effective cross-sectional area $A_2$ of said flow-modifying means is greater than 1.5, more preferably greater than 2.

Preferably when said hydrocyclone is designed to separate at least partially, if not to a substantial extent, less dense component/s from predominantly fluid mixtures having at least one predominant liquid component (for example, a small amount of oil, say less than 5%, from water) said ratio $A_1:A_2$ is more than 2, but more preferably greater than 5. In one design of a hydrocyclone according to the present invention, the said area ratio $A_1:A_2$ was varied from 4 to greater than 50. Desirable results of lighter phase stabilization and increased pressure at the outlet means for less dense component/s were achieved. However, if the said area ratio becomes too small, for example less than 1.5, the increased pressure loss to the outlet means for more dense component/s is believed to be excessive for commercial applications.

Said flow-modifying means may be further characterised in that said effective cross-sectional area of said means is positioned at least $$d_2/15$$

units towards said first end from said second end when measured along the hydrocyclone axis, more preferably at least $$d_2/6$$

units ($d_2$ being the nominal hydrocyclone diameter and being defined by the relation $$d_2 = \sqrt[3]{\frac{V}{24}}$$

V being the effective internal volume of the hydrocyclone). More preferably this distance is at least $d_2$ units.

In one design of a hydrocyclone in accordance with the present invention test were carried out wherein the position of the said flow-modifying means was altered from a location at the said second end to a location $3d_2$ units upstream of said second end. The desirable effects referred to previously became noticeable when said flow-modifying means was displaced $d_2/15$ units upstream of said second end and reached a maximum when said displacement was $2d_2$.

Optimum area ratio and said positioning of flowmodifying means for a particular hydrocyclone design is dependent upon such factors as velocity and ratio and said second end outlet design.

The geometry and design of the hydrocyclone wall in the region of said flow-modifying means is believed to have an important effect on the design and operation of the device. The hydrocyclone wall can assume many forms but desirably is designed so as to prevent, or at least limit, flow instability and disturbance. In particular, the design should be such that flow separation of that part of the fluid having a relatively high concentration of less dense component/s at or near the hydrocyclone axis is minimized upstream of said flow-modifying means. To this end it is preferable that the effective cross-sectional area, $A_3$, of the hydrocyclone at locations in the direction towards said second end of the hydrocyclone from the position of said flow-modifying means, be, in at least one location equal to, but more preferably less than, the said effective cross-sectional area $A_1$ of hydrocyclone at locations in the direction towards said first end from the position of said flow-modifying means.

More preferably, the area ratio $A_1$:$A_3$ is less than 1.5.

The area reductions according to the present invention are designed, configured and operated primarily in a manner to stabilise flow around said flow-modifying means and/or outlet and/or to increase the rotational velocity of the fluid towards said first end by the action of fluid viscosity and are not intended to act as external flow proportioning means in a manner achieved, for example, by the use of valves. For example U.S. Pat. Nos. 4,464,264 and 4,544,486 teach such flow proportioning means which behave as valves.

With hydrocyclones as described in the prior art the less sense component/s is/are often not in reverse flow, i.e. towards first end, at the second end, and consequently may flow out the outlet means for more dense component/s at the second end, resulting in reduced performance. With the present invention it is believed that this problem is greatly reduced. With a hydrocyclone well designed in accordance with this invention, it is possible to observe the less or least dense component/s central core terminating on the said flow-modifying device.

These aspects of the invention will be described with reference to the non-limitative examples illustrated in the accompanying diagrammatic drawings.

(B) General Light Dispersion Hydrocyclone

According to another aspect of this invention there is provided a hydrocyclone for separating at least partially, if not to a substantial extent, less dense component/s from predominantly fluid mixtures having at least one predominant liquid component, said hydrocyclone comprising at least a first end and, remote from said first end, a second end, the cross-sectional area of the hydrocyclone in at least one location towards said second end being less than the cross-sectional area of the hydrocyclone at said first end, and further including at least one inlet means in the region of said first end for introducing said fluid mixture/s and at least two outlet means with at least one outlet means in the region of said second end, and wherein the following criteria (1) to (4) apply:

Let $d_2$ be the nominal hydrocyclone diameter defined by:

$$d_2 = \sqrt[3]{\frac{V}{24}}$$

where V represents the effective internal volume of the hydrocyclone not including inlet and outlet ducts; and where, if the number of inlets in the region of the first end is n, n being an integer with a value equal to or greater than 1, let the $p^{th}$ inlet discharge a fluid mixture of mass flow rate $m_p$ into the hydrocyclone having a momentum per unit time $\overline{L}_p$ ($\overline{L}_p$ being a vector quantity) further let $<L_p$ be the vector component of $\overline{L}_p$ parallel to the plane normal to the hydrocyclone axis at the $p^{th}$ inlet, let $r_p$ be the minimum radius from the hydrocyclone axis to the point on the line of direction of said vector component $<L_p$, $r_p$ being parallel to the plane normal to the hydrocyclone axis at the $p^{th}$ inlet and $r_p$ being perpendicular to the line of direction of said vector component $<L_p$, let $d_i$ be the effective diameter of the said first end being defined as:

$$d_i = \frac{2 \times \sum_{p=1}^{n} r_p |<L_p|}{\sum_{p=1}^{n} |<L_p|}$$

and let $A_i$ be the effective inlet area as defined by:

$$A_i = \frac{\sum_{p=1}^{n} A_p |<L_p|}{\sum_{p=1}^{n} |<L_p|}$$

where $A_p$ is the total cross-sectional area at the $p^{th}$ inlet at entry to the hydrocyclone in a plane parallel to the hydrocyclone axis at inlet p and normal to the vector component $<L_p$;

1. The velocity ratio $V_r$ is defined by $$3 < \frac{\pi d_i d_2}{4A_i} < 28;$$

2. the hydrocyclone measured along the hydrocyclone axis from said first end to said second end is at least $10d_2$ units long;

3. the hydrocyclone further includes a section situated between said first and second end, of at least $8d_2$ units long when measured along the hydrocyclone axis where:

$$15' < \alpha < 2^\circ$$

and where $\alpha$ is the average half angle of convergence of the hydrocyclone wall when gross discontinuities are ignored and small steps smoothed;

4. the hydrocyclone further includes at least one (substantially axially symmetric) outlet for discharge of relatively high concentration of less or least dense component/s located at or near the hydrocyclone axis, said outlet having minimum effective cross-sectional diameter $d_o$ where:

$$d_o/d_2 < 0.25$$

The effective internal volume V is usually the volume of the hydrocyclone bounded by the hydrocyclone walls and by surfaces matching with the adjacent walls closing off exits and entrances to the hydrocyclone. However, the wall of the hydrocyclone is not necessarily the internal geometrical outline of the body. For example, the hydrocyclone body may be porous or the walls may be pitted. The effective internal volume V relates to the residence time of fluid inside the hydrocyclone, this being an important parameter.

What is meant by the "hydrocyclone wall" (and what is to be used in calculating the volume) for the purposes of this specification, is the wall or surface close to or adjacent to tracing the minimum area surface close to or adjacent to the geometrical wall which would define a hydrocyclone with substantially identical performance and flow field characteristics as the actual geometric design.

More preferably, $V_r$ is greater than 5 and less than 20, the hydrocyclone is at least 15 $d_2$ units long from first end to second end, the length over which the average angle $\alpha$ is more than 15' and less than 2° is at least 10 $d_2$ units, and $d_o/d_2<0.1$.

A hydrocyclone according to the present invention may be further characterised in that said outlet of minimum effective cross-sectional diameter $d_o$ is included for discharge of relatively high concentration of less dense component/s and is provided in the region of said first end.

According to a further aspect of this invention there is provided a hydrocyclone as previously described further characterized in that the effective diameter $d_o$ is located at some distance from said first end towards said second end and is positioned at or close to the hydrocyclone axis. Most preferably the distance is at least $2d_2$ units from said first end, more preferably more than $4d_2$ units.

Previous designs of hydrocyclones for separating less dense component/s from fluid mixtures have had outlet means of effective diameter $d_o$ located at or adjacent to said first end or at said second end, it being postulated that no substantial benefit was derived from locating said outlet means within the volume of the hydrocyclone (as for example, using a vortex finder). According to the present invention, locating said outlet means of effective diameter $d_o$ some distance towards said second end provides advantages which include a reduced pressure difference between hydrocyclone inlet means and said outlet means of effective diameter $d_o$.

A hydrocyclone according to the present invention can be further characterised in that said outlet of minimum effective cross-sectional diameter $d_o$ is located in the region of said second end in the region of (but more preferably on) the hydrocyclone axis.

Preferably, the effective cross-sectional area of the hydrocyclone in a direction towards said second end of hydrocyclone from the position of said outlet of minimum effective cross-sectional diameter $d_o$ is, in at least one location, an effective cross-sectional area equal to, but more preferably less than, the minimum effective cross-sectional area of the hydrocyclone in the direction towards said first end from the position of said outlet, and in a location that does not include said outlet means or, if present, said flow-modifying means, and in a plane normal to the hydrocyclone axis.

In one form of the invention, the hydrocyclone in the region of said first end may be provided with more than one type of inlet means, a first class of inlet means being fed with fluid from a lower pressure source than is the case with the other class or classes of inlet means. In this form fluid rotating about the hydrocyclone axis may have significant angular momentum sourced from the inlet means fed with fluid from the higher pressure source/s.

In yet another aspect of this invention there is included in the region of the second end means to convert at least some of the rotational motion of the fluid about the hydrocyclone axis to a motion which is substantially linear with respect to the hydrocyclone axis (for example, a tangential outlet) while imposing minimal viscous drag forces on the fluid while said fluid has a substantially rotational velocity. It appears that such means tend to maintain the desired rotation in the region of said second end, thereby increasing the hydraulic and separation efficiency of the hydrocyclone.

It is preferable that the hydrocyclone axis be straight, or curved smoothly in an arc of large radius or a number of linked arcs of large radii, or be composed of straight segments with small angle of transition therebetween. It is preferable that the cross-section at each point between said first end and said second end be substantially axially symmetric, i.e. substantially circular. It may be preferable for some applications that the inside surface of the hydrocyclone between said first end and said second end be smooth or otherwise such that boundary layer thickness adjacent the wall be kept minimal.

Preferably, discontinuities and/or steps in the hydrocyclone wall are small, more preferably there are no discontinuities and no steps or abrupt section changes.

Thus in yet another aspect of this invention the hydrocyclone may be generally of axially symmetric form. Further, the axis of the said hydrocyclone need not be a single straight line.

According to another form of this invention, there may be provided a hydrocyclone including substantially a series of flow-smoothing conical or otherwise tapered portions joining generally cylindrical portions.

The value of $d_2$ may be selected for engineering and practical convenience but usually will be greater than 6 mm and less than 100 mm.

The volume of free gas at the inlet means to be admitted to the hydrocyclone is preferably less than 20%.

The viscosity of the predominant fluid component in fluid mixture is preferably less than 200 centipoise at inlet conditions.

It is to be understood that different features may be added to hydrocyclones as described in this invention. These features being familiar to those skilled in the art of liquid/liquid hydrocyclones, include:

(a) Outlet means for drawing off remaining solid particle matter such as sand, from the hydrocyclone;
(b) inlet means for introducing a sparging solvent or gas into the hydrocyclone or into the hydrocyclone inlet/s to assist in moving particles towards the hydrocyclone axis;
(c) inlet means for introducing chemicals for purpose such as fluid property modification;
(d) outlet means for drawing off some of the fluid from the wall of the hydrocyclone, or certain portions of the external fluid flow;
(e) inlet means in the form of fixed or variable area nozzle/s for feeding mixture to be treated into the hydrocyclone; and
(f) inlet means towards said second end to help maintain rotation.

The various aspects of the invention as described here may be used in a hydrocyclone having variable geometry, i.e. that is a geometry that may change during operation of the hydrocyclone.

The hydrocyclone geometries described here may be used as part of a system having two or more hydrocyclones in a multi-stage system or operated in parallel and may have valves or other devices to control or measure pressure or flow of fluids at the inlets and/or outlets.

In relation to criterion (1) above, the preferred value of $V_r$ is dependent on the type of performance required from the hydrocyclone for the fluid concerned. One may prefer a larger value of $V_r$ in one or more of the following situations:

(i) where the viscosity of fluid within the hydrocyclone is relatively large;

(ii) where the particle size distribution of the less dense fluid component/s within the more dense component is relatively small;

(iii) where the desired purity of the stream of the more dense fluid component leaving the hydrocyclone at the said second end is relatively high;

(iv) where the density ratio of the less dense fluid component/s to the more dense fluid component/s is relatively close to 1;

(v) where the cost of fluid power (pressure x fluid mass flow rate at the inlet means) required at the inlet means of the hydrocyclone is relatively cheap;

(vi) where viscous losses due to, for instance, wall friction within the hydrocyclone is relatively large; or (vii) where the interfacial tension between fluid phases is relatively large.

This list is not to be regarded as exhaustive.

In relation to criterion (3) above, the preferred value of length of said section is also dependent on the performance desired from the hydrocyclone for the fluid mixture concerned. A greater value of said length can lead to greater residence time of the fluid in the hydrocyclone, giving more time for particles of the less dense component/s contained in the more dense component/s to migrate towards the hydrocyclone axis. However, a greater value of this length can also give rise to greater viscous losses because of the effect of wall friction which tends to reduce the rotational velocity of the fluid in the hydrocyclone thus reducing the centripetal body forces acting to force the particles of the less dense component/s towards the hydrocyclone axis. Viscous losses due to wall friction may be more significant for fluids having a greater viscosity.

Preferably the invention relates to a hydrocyclone as hereinbefore described but further characterised in that it is not constructed of two or three generally cylindrical portions and/or does not include substantially identical substantially equally circumferentially spaced tangentially directed feeds.

Also, preferably the invention relates to a hydrocyclone with a single inlet means as previously described but further characterised in that if the generator of the primary portion of said hydrocyclone is a continuously curved line (or is not straight, or wherein the inlet gives it an inwards spiralling feed channel), then the swirl number, as defined by the relation $$\frac{\pi d_i' \, d_2'}{4A_i'}$$

where $d_i'$ is the diameter of the hydrocyclone at the location/s of the inlet means, $A_i'$ is the area of the inlet means where flow enters the hydrocyclone measured in the plane including the hydrocyclone axis and the mean point of flow entry, and $d_2'$ is the diameter of said hydrocyclone measured at point $z_2'$ where the condition first applies that $$\tan^{-1}\left(\frac{d_2' - d'}{2(z' - z_2')}\right) < 2° \text{ for all } z' > z_2'$$

where $z'$ is the distance along the hydrocyclone axis downstream of the inlet means and $d'$ is the diameter of the hydrocyclone at that point, is greater than 12.

Also, preferably the invention relates to a hydrocyclone with a plurality, of inlet means as previously described but further characterised in that if said plurality of inlet means are not axially staggered and/or do not include feed channels which are inwardly spiral, and/or if part of the generator of the primary portion is curved then the swirl number as defined by the relation $$\frac{\pi d_i' \, d_2'}{4A_i'}$$

must be greater than 12.

There are a number of applications for which hydrocyclones according to this invention may be used. It is to be understood that a particular hydrocyclone geometry is not necessarily suitable or optimal for all applications.

According to another aspect of the present invention there are provided hydrocyclones as previously disclosed for separation said predominantly fluid feed mixtures having at least one predominant liquid component and further including at least one component to be separated at least partially, if not to a substantial extent, said latter component being prone to further emulsification in regions of high fluid shear. More particularly, said fluid feed mixtures consist substantially of oil and water.

Criteria examined when selecting the geometry for a hydrocyclone for application to fluid mixtures may include:

1. The ratio of densities between components to be separated;
2. the particle size distribution of components;
3. the interfacial properties and behaviour of the fluid particles and mixtures (in particular, interfacial tension);
4. the desired purity of streams leaving the hydrocyclone;
5. the desired flow rate of the streams leaving the hydrocyclone relative to the stream/s entering the hydrocyclone;
6. the volume of gaseous component/s at inlet or outlet conditions;
7. the volume of gaseous component/s that may break out of solution within the hydrocyclone (usually as a result of pressure reduction within the hydrocyclone;
8. the nature and effect of chemical reactions that may be occurring within the hydrocyclone;
9. the quantity, size and other factors relating to solids entering the hydrocyclone e.g. whether or not the solids are wetting to the lighter component/s or more dense component/s;
10. the pressure available at inlet means and outlet means;
11. the geometry and size or space available for hydrocyclone installation;
12. fluid component viscosity;
13. cost; and
14. operational and maintenance factors.

This invention extends to a method of separating at least partially, if not to a substantial extent, predominantly fluid mixtures of two or more components of differing densities, comprising feeding the fluid mixture/s into a hydrocyclone as herein described via the inlet means of said hydrocyclone the fluid mixture/s being at a higher pressure than at the outlet means of said hydrocyclone.

Embodiments of the invention will now be described with reference to the non-limitative examples illustrated in the accompanying diagrammatic drawings in which FIG. 1 depicts a longitudinal section through a hydrocyclone according to the present invention;

Figure 1:
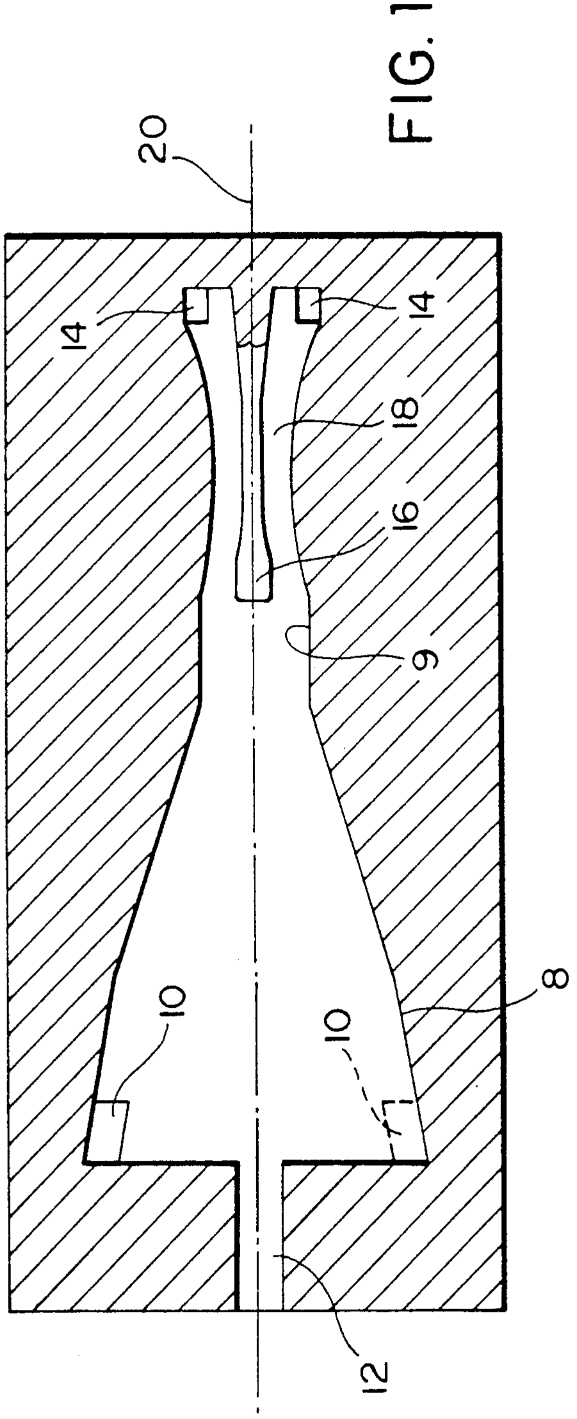

In FIG. 1, 8 denotes the hydrocyclone wall 10 denotes hydrocyclone inlet means for admission of fluid mixture to be separated, 12 denotes upstream outlet means of said hydrocyclone where fluid having a relatively large proportion of less dense component/s is discharged from the hydrocyclone, 14 denotes downstream outlet means where fluid having a greater proportion of more dense component/s than the feed mixture is discharged from the hydrocyclone, 16 represents flow-modifying means according to the present invention, 18 denotes mechanical support and location means for flow-modifying means 16, and 20 denotes the hydrocyclone axis. Flow-modifying means 16 has a minimum effective cross-sectional area $A_2$. The minimum effective cross-sectional area of the hydrocyclone upstream of flow-modifying means 16, i.e. towards first end, is $A_1$ and the minimal cross-sectional area of the hydrocyclone downstream of flow-modifying means 16, i.e. towards the second end, is denoted as $A_3$.

Figure 2:
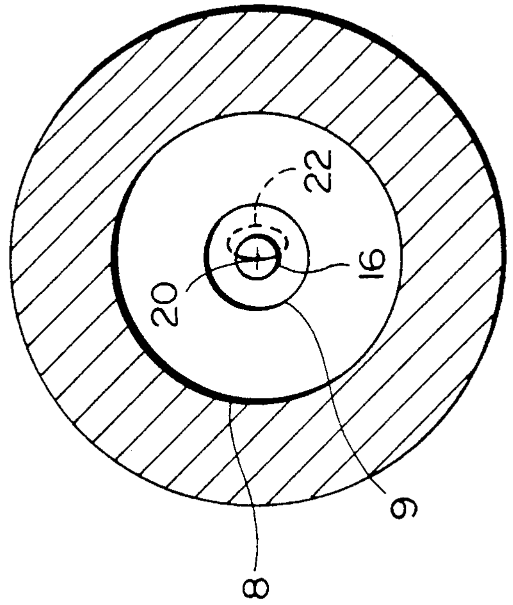
FIG. 2 depicts a cross-section through a hydrocyclone according to the present invention, said transverse view being in the direction from first end towards second end.

In FIG. 2, 8 denotes the hydrocyclone wall upstream of flow-modifying means 16, and 9 denotes the hydrocyclone wall down-stream of flow-modifying means 16. $A_2$ is the effective cross-sectional area of flow-modifying means 16. 22 depicts an asymmetric example of a flow-modifying means according to the present invention and 20 denotes the hydrocyclone axis.

Figure 3:
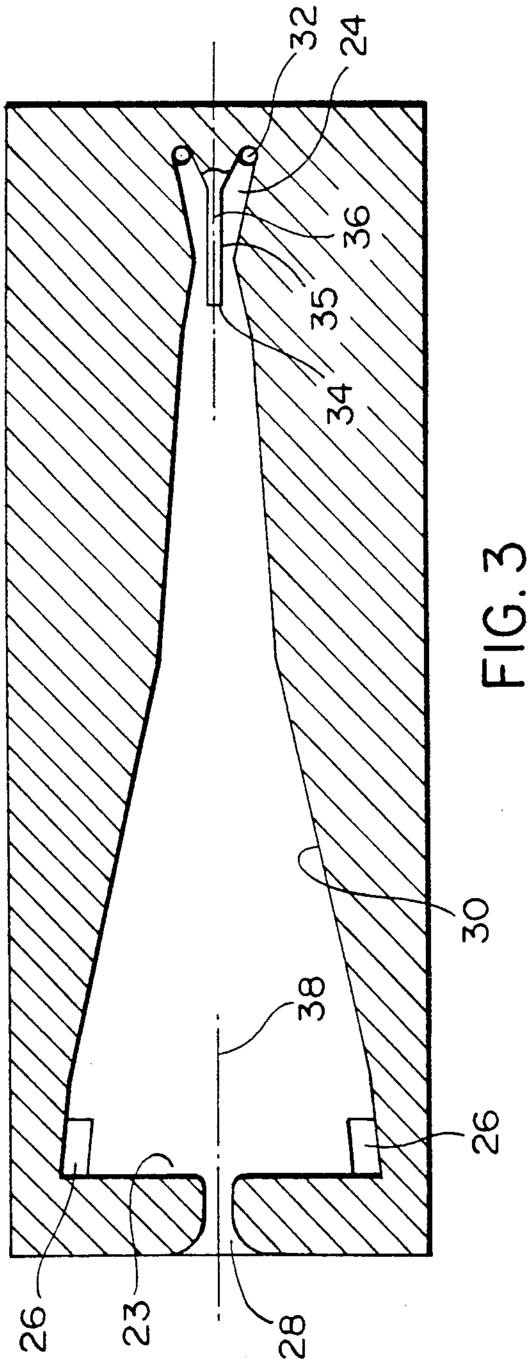
FIGS. 3, 4, 5 and 6 depict longitudinal sections through or longitudinal profiles of hydrocyclones according to the present invention.

In FIG. 3, 23 denotes the region near the first end of a hydrocyclone according to the present invention, 24 denotes the region near the second end of said hydrocyclone, 26 denotes inlet means for admission of feed mixture to the hydrocyclone, 28 denotes outlet means for discharge of fluid having an increased proportion of less dense component/s than the feed mixture. 30 denotes the hydrocyclone wall, 32 denotes outlet means for discharge of fluid having an increased proportion of more dense component/s than the feed mixture, 34 denotes a flow-modifying means according to the present invention, 35 denotes support and/or location means for flow-modifying means 34, the axis 36 of support means 35 coinciding with the hydrocyclone axis 38.

Figure 4:
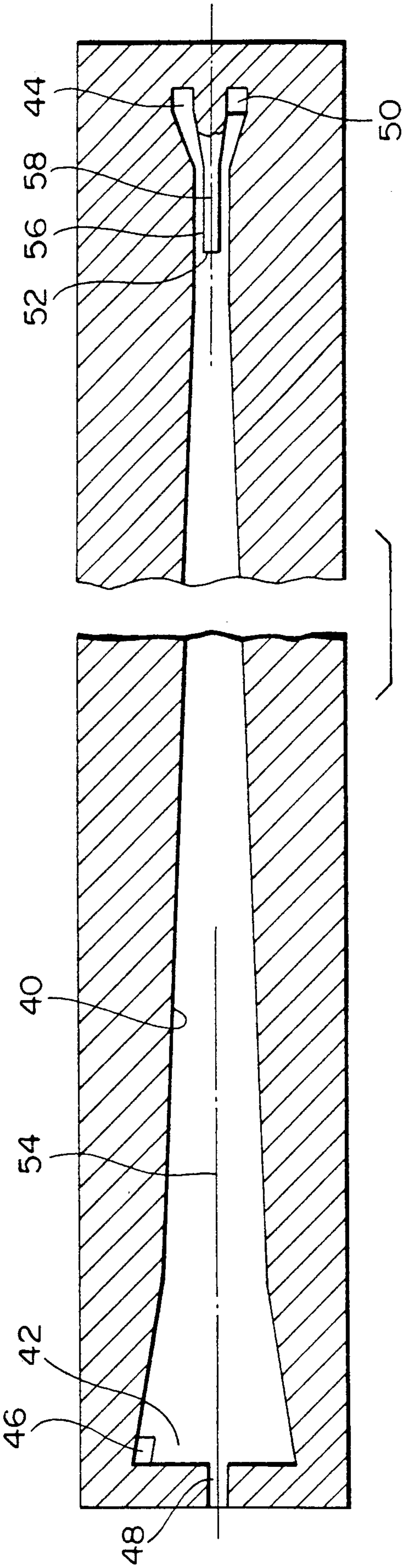

In FIG. 4 40 denotes the hydrocyclone wall, 42 denotes the region near the first end of the hydrocyclone. 44 denotes the region near the second end of said hydrocyclone, 46 denotes inlet means for admission of feed mixture to the hydrocyclone (one of the inlet means not being shown), 48 denotes outlet means for discharge of fluid having an increased proportion of less dense component/s than the feed mixture, 50 denotes outlet means for discharge of fluid having an increased proportion of more dense component/s than the feed mixture (one of the outlet means not being shown), 52 denotes a flow-modifying means according to the present invention, 54 denotes the hydrocyclone axis, 56 denotes location and/or support means for flow-modifying means 52, 58 denotes the longitudinal axis of location and/or support means 56. Outlet means 50 (one of the outlet means not being shown) are tangential outlets designed to convert at least some of the rotational motion of fluid about the hydrocyclone axis to a motion which is substantially linear. It is believed that a hydrocyclone in accordance with this design is suitable both for separating less dense component/s fluid mixtures and more dense component/s from fluid mixtures.

Figure 5:
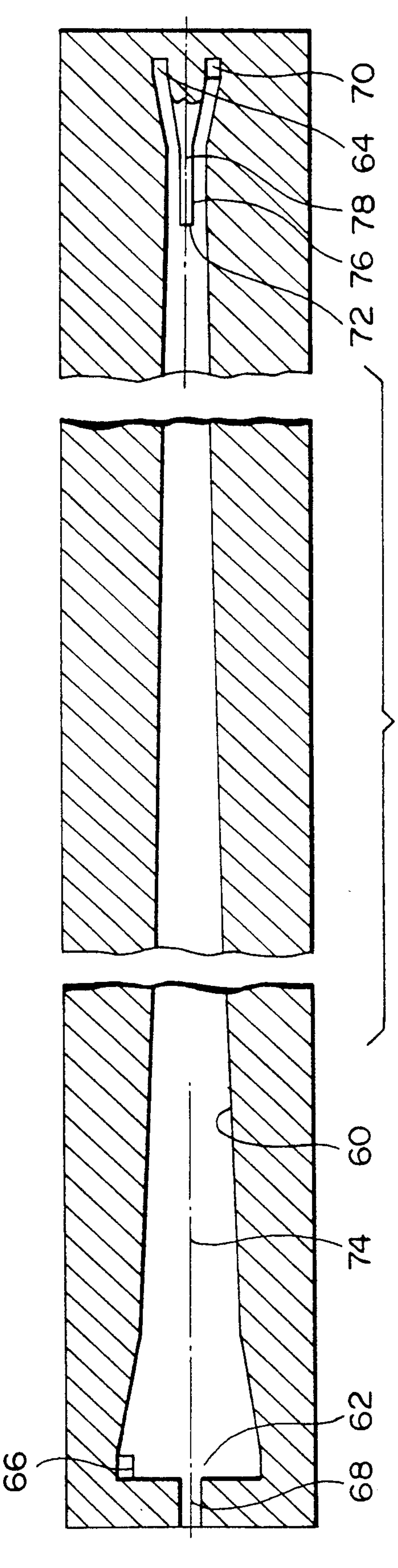

In FIG. 5, 60 denotes the hydrocyclone wall, 62 denotes the region near the first end of the hydrocyclone, 64 denotes the region near the second end of said hydrocyclone, 66 denotes inlet means for admission of feed mixture to the hydrocyclone (one of the inlet means not being shown), 68 denotes outlet means for discharge of fluid having an increased proportion of less dense component/s than the feed mixture, 70 denotes outlet means for discharge of fluid having an increased proportion of more dense component/s than the feed mixture (one of the outlet means not being shown), 72 denotes a flow-modifying means according to the present invention, 74 denotes the hydrocyclone axis, 76 denotes location and/or support means for flow-modifying means 72, 78 denotes the longitudinal axis of location and/or support means 76. Outlet means 70 are tangential outlets designed to convert at least some of the rotational motion of fluid about the hydrocyclone axis to a motion which is substantially linear. It is believed that a hydrocyclone in accordance with this design is suitable for separating less dense component/s from fluid mixtures, being longer than the design depicted in FIG. 4, thereby leading to a greater residence time within the hydrocyclone. This increases the time available for the less dense component/s to migrate towards the hydrocyclone axis.

Figure 6:
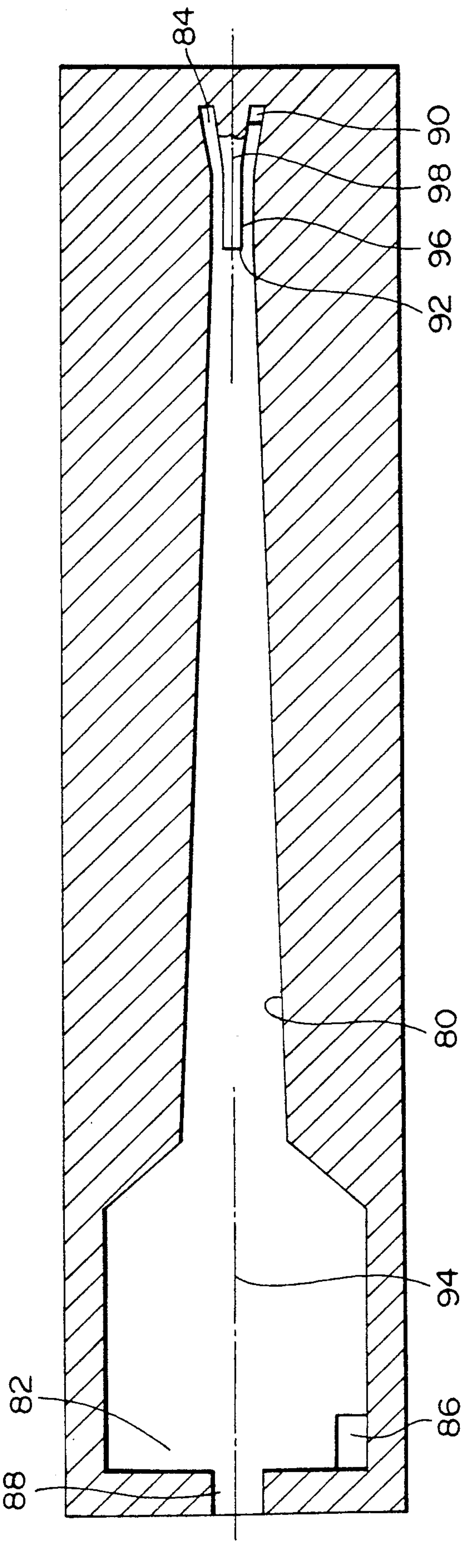

In FIG. 6, 80 denotes the hydrocyclone wall, 82 denotes the region near the first end of the hydrocyclone, 84 denotes the region near the second end of the hydrocyclone, 86 denotes inlet means for admission of feed mixture to the hydrocyclone (one of the inlet means not being shown), 88 denotes outlet means for discharge of fluid having an increased proportion of less dense component/s than the feed mixture, 90 denotes outlet means for discharge of fluid having an increased proportion of more dense component/s than the feed mixture (one of the outlet means not being shown), 92 denotes a flow-modifying means according to the present invention, 94 denotes the hydrocyclone axis, 96 denotes location and/or support means for flow-modifying means 92, 98 denotes the longitudinal axis of location and/or support means 96. Outlet means 90 are tangential outlets designed to convert at least some of the rotational motion of fluid about the hydrocyclone axis to a motion which is substantially linear. It is believed that a hydrocyclone in accordance with this design is suitable for separating more dense components from fluid mixtures.

The twin tangential inlet means of rectangular cross-section shown in FIGS. 1, 3, 4, 5 and 6 are believed to give rise to a substantially axially-symmetric flow regime in the region of the first end of the respective hydrocyclones, and allow the incoming flow of feed mixture to be introduced close to the hydrocyclone wall, thereby maximizing usage of the hydrocyclone geometry in the region of the first end in producing, inducing or tending to rotational velocity in the feed mixture.

According to the preferred embodiments, the hydrocyclone is operated with sufficiently large inlet volumetric flow rate such that a substantial proportion of fluid within the hydrocyclone has a rotational velocity about the hydrocyclone axis and a corresponding centripetal acceleration which is much greater than $10 m/s^2$. The hydrocyclone may be operated with the hydrocyclone axis being at any desired orientation with respect to the local gravitational field without significant impairment of performance. Similarly such a hydrocyclone may be operated, while firmly attached to accelerating objects such as a ship or a floating oil production platform in a rough sea without significant impairment of performance. Hydrocyclones according to the present invention are often operated without an air core.

EXAMPLE 1

The fluid mixture to be treated was oily water, with emulsified oil droplets of average size of 35 μm and a total oil component of less than 2000 parts per million (on a volume basis). The object was to remove the largest part of the oil component and concentrate this into an outstream of approximately 2% of the inlet flow. It was also desired that the hydrocyclone be energy efficient and compact.

A design suitable for this duty in accordance with the present invention is shown in FIG. 4. For this design V is approximately $705 \times 10^3$ mm³, $d_2 \approx 30.9$ mm, $d_o = 2$ mm, $d_i = 63.8$ mm, $A_1 = 243$ mm², $A_2 = 32$ mm², $A_i = 172$ mm², $A_3 = 91$ mm².

Hence, $V_r = 6.37$;

length of hydrocyclone from first end to second end = 1157 mm:

hydrocyclone has a section of length greater than $10d_2$ units where $15' < \alpha < 2°$;

$d_o/d_2 = 0.06$;

and $A_1/A_2 = 7.6$ and $A_1/A_3 = 2.7$.

A hydrocyclone of the above design will perform satisfactorily in the absence of flow-modifying means as previously described, but at a flow of 50 l/min the use of a flow-modifying means in accordance with the present invention results in an increase in the pressure, at constant flow, of approximately 10 kPa, thereby increasing hydrocyclone turndown ratio.

EXAMPLE 2

The fluid mixture to be treated was a highly emulsified oil-in-water mixture with oil-in-water concentrations below 2000 ppm (on a volume basis) and an average oil droplet particle size of less than 20 μm. The aim was to achieve minimum contamination of the outlet water component, with the concentrated oily stream being approximately 2% of the inlet feed.

A design suitable for this particular duty is shown in FIG. 5.

For the design $d_2 \approx 32.4$ mm, $d_i = 65.2$ mm, $A_1 = 243$ mm², $A_2 = 32$ mm², $A_3 = 195$ mm², $A_i = 143$ mm².

Hence, $V_r = 11.6$;

length of hydrocyclone from first end to second end = 1557 mm;

hydrocyclone has a section of length greater than $10d_2$ units where $15' < \alpha < 2°$;

$d_o/d_2 = 0.062$;

and $A_1/A_2 = 7.6$ and $A_1/A_3 = 1.2$.

EXAMPLE 3

The fluid mixture to be treated was a mixture of water of average particle size 40 μm dispersed in oil. The concentration of the water was less than 10% by volume. The primary objective was to reduce the concentration of water in the oil. A design believed to be suitable for this duty is shown in FIG. 6.

For this design $d_2 = 25$ mm. $A_1 = 75.4$ mm², $A_2 = 28.3$ mm², $A_3 = 35.3$ mm²; hence $A_1/A_2 = 2.7$ and $A_1/A_2 = 2.1$.

It is believed that the invention and many of its attendant advantages will be understood from the foregoing description and it will be apparent that various changes may be made in the form, construction and arrangement of the hydrocyclone and that changes may be made in the form, construction and arrangement of the hydrocyclone described without departing from the spirit and scope of the invention or sacrificing all of its material advantages, the hydrocyclone hereinbefore described being merely preferred embodiments thereof.

We claim:

1. A method of separating a fluid mixture of a dispersed phase of a lighter component in a continuous phase of a denser liquid component, comprising feeding said mixture to a hydrocyclone comprising opposite first and second ends, between which a hydrocyclone axis extends, the hydrocyclone having a cross-sectional area decreasing overall from said first end to said second end; inlet means adjacent to said first end for introducing the mixture into said hydrocyclone; and first and second outlet means for discharging respectively comparatively less and comparatively more dense components separated from said mixture, said first outlet means being located substantially on said hydrocyclone axis; and said second outlet means being adjacent to said second end; the cyclone further having a nominal hydrocyclone diameter $d_2$ defined by:

$$d_2 = \sqrt[3]{\frac{V}{24}}$$

where V represents an effective internal volume of the hydrocyclone not including inlet and outlet ducts; said inlet means comprising a number of inlets in the region of said first end said number being an integer n with a value of at least 1, wherein at least a part of said mixture is fed through one of said inlets designated the $P^{th}$ inlet into said hydrocyclone with a mass flow rate m and a momentum per unit time $L_p$ ($L_p$ being a vector quantity), $<L_p$ being a vector component of $L_p$ parallel to a plane normal to the hydrocyclone axis at the $P_{th}$ inlet, $r_p$ being the minimum radius from the hydrocyclone axis to a point on a line of direction of said vector component $<L_p$, $r_p$ being parallel to the plane normal to said hydrocyclone axis at the $p^{th}$ inlet and $r_p$ being perpendicular to a line of direction of said vector component $<L_p$, $d_i$ being an effective diameter of the said first end being defined as:

$$d_i = \frac{2 \times \sum_{P=1}^{n} r_p <L_p}{\sum_{P=1}^{n} <L_p}$$

and $A_i$ being an effective inlet area as defined by:

$$A_i = \sum_{P=1}^{n} A_P \left( \frac{|<L_P|}{\sum_{p=1}^{n} |<L_p|} \right)$$

where $A_p$ is a total cross-sectional area at the $P^{th}$ inlet at entry to the hydrocyclone in a plane parallel to said hydrocyclone axis at inlet p and normal to the vector component $<L_p$; the following criteria exist:

A. $3<V_r 28$, where $$V_r = \frac{\pi d_i d_2}{4A_i}$$

B. the hydrocyclone measured along said hydrocyclone axis from said first end to said second end is at least $10d_2$ long;

C. said hydrocyclone includes a section situated between said first and second end, of at least $8d_2$ long when measured along said hydrocyclone axis where: $15'<\alpha<20$ $\alpha$ being an average half angle of convergence of a side wall of said hydrocyclone; and, D. said first outlet means having a minimum effective cross-section diameter $d_o$ where $$\frac{d_o}{d_2} < 0.25$$

and there being provided adjacent to said second end, means to convert at least some rotational motion of said liquid about said hydrocyclone axis to a motion which is substantially linear while imposing minimal viscous drag forces on said liquid while said liquid has a substantially rotational velocity.

2. The invention as claimed in claim 1, wherein $V_r$ is greater than 5 and less than 20, said hydrocyclone is at least $15d_2$ long from said first end to said second end, the length over which said average angle $\alpha$ is more than 15' and less than 2° is at least $10d_2$, and $d_o d_2<0.1$.

3. The invention as claimed in claim 1 wherein said first outlet means is provided adjacent to said first end.

4. The invention according to claim 1 wherein said first outlet means is located a distance at least $2d_2$ from said first end towards said second end.

5. The invention according to claim 4, wherein said distance is at least $4d_2$.

6. The invention as claimed in claim 1, which is provided with more than one type of said inlet means, a first type of said inlet means being fed with fluid from a lower pressure source than is the case with another type of said inlet means.

7. The invention as claimed in claim 1, wherein said means to convert at least some of said rotational motion of said liquid about said hydrocyclone axis to a motion which is substantially linear is in the form of one or more tangential outlets providing said second outlet means.

8. The invention as claimed in claim 1, wherein the value of $d_2$ is greater than 6 mm and less than 100 mm.

9. The invention according to claim 1, wherein said first outlet means is adjacent to said first end; wherein said hydrocyclone includes flow-modifying means providing part way along said hydrocyclone axis from said second end towards said first end an obstruction to increase the pressure or flowrate of said comparatively less dense component out of said first outlet means; and wherein the ratio of the minimum effective area of said hydrocyclone cross-section ($A_1$) of that part of said hydrocyclone between said first end and said obstruction to the effective cross-sectional area ($A_2$) of said obstruction is greater than 2.

10. The invention as claimed in claim 9, wherein said ratio $A_1$:$A_2$ is greater than 5.

11. The invention according to claim 10, wherein said mixture is a mixture of oil and water.

12. The invention according to claim 9, wherein said obstruction is positioned at least $d_2/15$ towards said first end from an end wall at said second end when measured along said hydrocyclone axis.

13. The invention as claimed in claim 12, wherein said obstruction is positioned at least $d_2/6$ towards said first end from said end wall.

14. The invention according to claim 9, wherein the effective area of said hydrocyclone cross-section ($A_3$) at least one location along said hydrocyclone axis from said obstruction towards said second end is no greater than said area $A_1$.

15. A method of separating a fluid mixture of a dispersed phase of a lighter component in a continuous phase of a denser liquid component, comprising feeding, said mixture to a hydrocyclone comprising opposite first and second ends, between which a hydrocyclone axis extends, the hydrocyclone having a cross-sectional area decreasing overall from said first end to said second end; inlet means adjacent to said first end for introducing the mixture into said hydrocyclone; and first and second outlet means respectively adjacent to said first and second ends for the discharge respectively of comparatively less and more dense components separated from said mixture, said first outlet means being located substantially on said hydrocyclone axis; the cyclone further having a nominal hydrocyclone diameter $d_2$ defined by:

$$d_2 = \sqrt[3]{\frac{V}{24}}$$

where V represents an effective internal volume of the hydrocyclone not including inlet and outlet ducts; said inlet means comprising a number of inlets in the region of said first end said number being integer n with a value equal to at least 1, wherein at least a part of said mixture is fed through one of said inlets designated the $P^{th}$ inlet into said hydrocyclone with a mass flow rate m and a momentum per unit time $L_p$ ($L_p$ being a vector quantity), $<L_p$ being a vector component of $L_p$ parallel to a plane normal to the hydrocyclone axis at the $P_{th}$ inlet, $r_p$ being a minimum radius from the hydrocyclone axis to a point on a line of direction of said vector component $<L_p$, p being parallel to the plane normal to said hydrocyclone axis at the $P^{th}$ inlet and $r_p$ being perpendicular to the line of direction of said vector component $<L_p$, $d_i$ being an effective diameter of the said first end being defined as:

$$d_i = \frac{2 \times \sum_{P=1}^{n} r_p |<L_p|}{\sum_{P=1}^{n} |<L_p|}$$

and $A_i$ being an effective inlet area as defined by:

$$A_i = \sum_{P=1}^{n} A_P \left( \frac{|<L_p|}{\sum_{p=1}^{n} |<L_p|} \right)$$

where $A_p$ is a total cross-sectional area at the $p^{th}$ inlet at entry to the hydrocyclone in a plane parallel to said hydrocyclone axis at inlet p and normal to the vector component $<L_p$; the following criteria exist:

A. $3<V_r<28$, where $$V_r = \frac{\pi d_i d_2}{4A_i}$$

B. the hydrocyclone measured along said hydrocyclone axis from said first end to said second end is at least $10d_2$ long;

C. Said hydrocyclone includes a section situated between said first and second end, of at least $8d_2$ long when measured along said hydrocyclone axis where:

$$15' < \alpha < 2°$$

$\alpha$ being the average half angle of convergence of a side wall of said hydrocyclone; and, D. said first outlet means having a minimum effective cross-sectional diameter $d_o$ where $$\frac{d_o}{d_2} < 0.25.$$

there being provided adjacent to said second end means to convert at least some rotational motion of said liquid about said hydrocyclone axis to a motion which is substantially linear while imposing minimal viscous drag forces on said liquid while said liquid has a substantially rotational velocity; and wherein said hydrocyclone includes flow-modifying means providing part way along said hydrocyclone axis from said second end towards said first end an obstruction to increase at least one of the pressure and flowrate of comparatively less dense component out of said first outlet means; and wherein the ratio of the minimum effective area of said hydrocyclone cross-section ($A_1$) of that part of said hydrocyclone between said first end and said obstruction to the effective cross-sectional area ($A_2$) of said obstruction is greater than 2.

16. The invention as claimed in claim 15, wherein said means to convert at least some of said rotational motion of said liquid about said hydrocyclone axis to a motion which is substantially linear is in the form of one or more tangential outlets providing said second outlet means.

* * * * *